Feb. 28, 1961 K. BAUER 2,973,355
PROCESS FOR THE PRODUCTION OF PURE ε-CAPROLACTAM
FROM BECKMANN REACTION MIXTURE
Filed Nov. 5, 1957
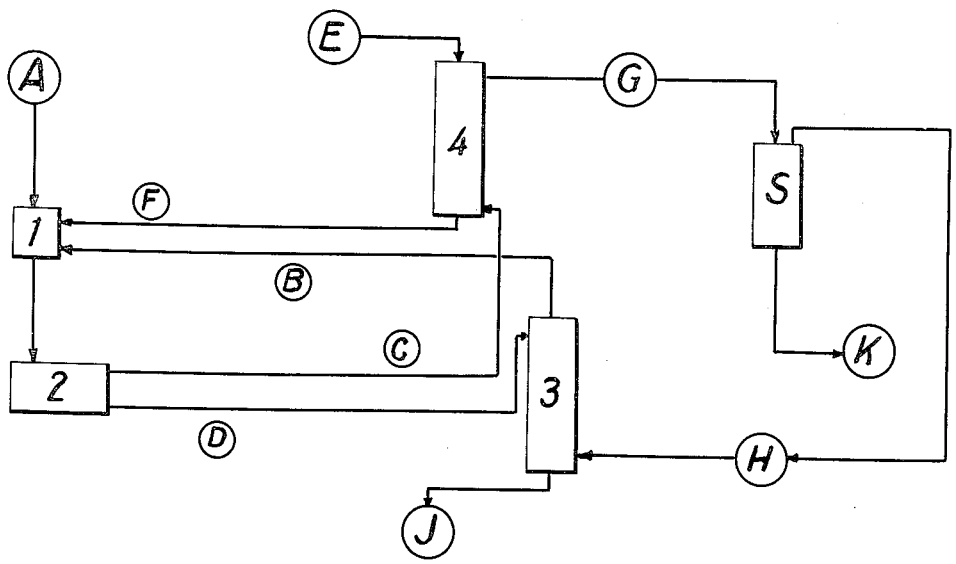
INVENTOR
KURT BAUER
BY Connolly and Hutz
ATTORNEY

United States Patent Office 2,973,355
Patented Feb. 28, 1961

2,973,355
PROCESS FOR THE PRODUCTION OF PURE ε-CAPROLACTAM FROM BECKMANN REACTION MIXTURE

Kurt Bauer, Holzminden, Germany, assignor to Farbenfabriken Bayer Aktiengesellschaft, Leverkusen, Germany, a corporation of Germany Filed Nov. 5, 1957, Ser. No. 694,675
Claims priority, application Germany Nov. 10, 1956
2 Claims. (Cl. 260—239.3)

In the Beckmann re-arrangement of cyclohexanone-oxime to caprolactam, a reaction product is obtained after neutralisation which consists of two phases: a concentrated aqueous sulphate solution, chiefly ammonium sulphate solution, wherein some lactam still is dissolved as underlye, and so-called lactam oil, a raw lactam containing about 30 percent of water. It is not possible to isolate the lactam in a usefully pure form by either distillation of the lactam oil separated from the aforesaid underlye or by extraction of the lactam from the oil with organic solvents.

A known proposal for overcoming this disadvantage consists in that the lactam oil, prior to extraction of the lactam, is concentrated by evaporation of a part of the water to a lactam content of 80–90 percent by weight. The lactam purified by extraction with, for example, benzene is then completely extracted with water by a multistep treatment, if desired, in counter-current, and the aqueous extract thus obtained is then subjected to a treatment with a water-immiscible organic solvent, preferably again benzene.

According to another known process, the lactam is extracted from the oil with benzene in several steps with saturated salt solution being added at each extraction step so as to keep the lactam solution saturated with lactam and salt. Finally, a highly dilute benzenic lactam solution is obtained which is advantageously after-treated with acid or alkaline agents or with oxidising or reducing agents. The lactam is then obtained in a pure state by vacuum distillation.

It has now been found that ε-caprolactam can be produced in a pure state by a technically particularly advantageous method from the neutralised mixture obtained in the Beckmann re-arrangement by intimately mixing the two-phase re-arrangement mixture with about 2–10 parts by weight of benzene, calculated on the lactam content of the mixture, separating the fresh two-phase mixture thus obtained and distilling off first the benzene and then the caprolactam, advantageously after a purification known as such.

This process compared with the known processes has the advantage that it yields, on the one hand, a comparatively concentrated benezenic lactam extract containing little water (about 2–3 percent calculated on the lactam) and, on the other hand, an underlye containing a maximum of only ⅓ of the lactam quantity which the under-lye of the known processes contain.

It is surprising that it is possible at the same time to isolate the lactam by extracting it from a mixture of the lactam oil and the under-lye, because such a procedure was previously considered to be scarcely feasible owing to the risk of formation of three phases (lactam solvent, undissolved raw lactam and salt solution), (cf. for example Swiss patent specification No. 294,693, page 2, lines 34–43, and page 3, lines 51–58).

The process of the invention may be further improved by washing out the last residues of lactam (about 0.3 percent referred to the under-lye) dissolved in the under-lye obtained after separating the organic phase according to the invention with benezene, and using the benzene extract, containing only little lactam, thus obtained, instead of fresh benzene, for mixing with the original two-phase mixture.

Purification of the benzenic lactam solution obtained after separation of the freshly formed two-phase mixture, which is generally advisable, is advantageously carried out by washing with preferably slightly acidified water. For this purpose it is advantageous to use in general quantities of about 0.1 to 10 percent calculated on the benzenic solution. The wash water thus obtained is expediently also added to the original two-phase mixture before or during the mixing with benzene.

The following example is given for the purpose of illustrating the invention.

*Example*

According to an arrangement illustrated in the accompanying drawing, there are intimately mixed in a mixer 1, 5.1 litres of a neutralised two-phase Beckmann re-arrangement mixture A containing 425 grams of ammonium sulphate and 118 grams of ε-caprolactam per litre, 1.6 litres of a dilute solution B of ε-caprolactam in benzene coming from the lactam extraction of the under-lye 3 obtained at a later stage and 0.18 litre of a dilute solution F of caprolactam-containing sulphuric acid originating from the washing process of the benzene extract 4. The mixture is then directed into a separating vessel 2 where it is separated to form an upper layer of 2.28 litres of a benzenic solution of caprolactam C and a lower layer of 4.6 litres of an ammonium sulphate solution D still containing about 0.3 percent of caprolactam.

This ammonium sulphate solution D is washed practically free from lactam in an extraction column 3 in countercurrent with benzene H coming from the benzene distillation S. The solution J thus obtained may be worked up into solid ammonium sulphate, if desired. The dilute benzenic solution of caprolactam B leaving at the top 3 is directed to the mixer 1 as mentioned above.

The benzenic solution of raw caprolactam C leaving the separating vessel 2 at the top is washed in countercurrent in an extraction column 4 with 0.09 litre of a 0.5 percent solution of sulphuric acid E. The aqueous wash liquor F containing little caprolactam and leaving at the bottom is directed into the mixer 1 whilst the purified caprolactam solution G leaves at the top and is directed to the benzene distillation S where it is separated into 1.6 litres of benzene H and 595 grams of lactam K. The evaporated benzene is condensed and used for the extraction of the underlye 3. The lactam K is finally distilled in known manner and then obtained in a pure form so that it may be used for the production of polyamide for making finished products.

I claim:

1. The process for the recovery of ε-caprolactam from the neutralized reaction mixture from the Beckmann re-arrangement which comprises mixing in a continous manner the two-phase mixture with about 2 to 10 parts by weight of a diluted solution of lactam in benzene, calculated on one part by weight of lactam in the mixture, separating the thus obtained new two-phase mixture, washing the concentrated solution of lactam in benzene with about 0.1 to 10 percent water, calculated on the benzene solution, distilling off the benzene and the trace of water from the organic phase and distilling the remaining lactam, simultaneously washing the separated concentrated aqueous underlye with fresh benzene mixing the obtained diluted solution of lactam in benzene with the original two-phase mixture, and also adding the wash water of the benzene extract to the original two-phase mixture.

2. The process of claim 1 wherein the wash water is weakly acidified.

References Cited in the file of this patent

UNITED STATES PATENTS

| | | |
|---|---|---|
| 2,221,369 | Cass | Nov. 12, 1940 |
| 2,313,026 | Schlack | Mar. 2, 1943 |
| 2,423,200 | Wighton et al. | July 1, 1947 |
| 2,573,374 | Wichterle | Oct. 30, 1951 |
| 2,758,991 | Kretzers et al. | Aug. 14, 1956 |